United States Patent
Okawara et al.

(10) Patent No.: US 6,895,769 B2
(45) Date of Patent: May 24, 2005

(54) AIR CONDITIONING APPARATUS USING SUPERCRITICAL REFRIGERANT FOR VEHICLE

(75) Inventors: Yasuhito Okawara, Tochigi (JP); Toshio Yajima, Ashikaga (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/768,636

(22) Filed: Feb. 2, 2004

(65) Prior Publication Data

US 2004/0237549 A1 Dec. 2, 2004

(30) Foreign Application Priority Data

Feb. 3, 2003 (JP) ........................................ 2003-026035

(51) Int. Cl.⁷ ................................................. F25B 1/00
(52) U.S. Cl. ...................... 62/228.3; 62/228.5; 62/323.4
(58) Field of Search .......................... 62/174, 190, 208, 62/228.3, 228.5, 323.1, 323.4; 417/42, 28, 212, 213

(56) References Cited

U.S. PATENT DOCUMENTS

| | | | | |
|---|---|---|---|---|
| 5,634,349 A | * | 6/1997 | Kakehashi et al. | 62/198 |
| 6,105,380 A | * | 8/2000 | Yokomachi et al. | 62/228.3 |
| 6,105,386 A | * | 8/2000 | Kuroda et al. | 62/513 |
| 6,164,086 A | * | 12/2000 | Kita et al. | 62/513 |
| 6,182,456 B1 | * | 2/2001 | Yamaguchi et al. | 62/222 |
| 6,260,367 B1 | * | 7/2001 | Furuya et al. | 62/197 |
| 6,260,369 B1 | * | 7/2001 | Yokomachi et al. | 62/228.5 |
| 6,293,123 B1 | * | 9/2001 | Iritani et al. | 62/409 |
| 6,523,360 B2 | * | 2/2003 | Watanabe et al. | 62/204 |
| 6,694,763 B2 | * | 2/2004 | Howard | 62/228.3 |
| 6,786,057 B2 | * | 9/2004 | Ben Yahia | 62/222 |
| 6,817,193 B2 | * | 11/2004 | Caesar et al. | 62/133 |

FOREIGN PATENT DOCUMENTS

| | | | | |
|---|---|---|---|---|
| JP | 2931668 A | | | 5/1999 |
| JP | 02002061969 a | | * | 2/2002 |
| JP | 02002130849 a | | * | 5/2002 |
| WO | WO 93/06423 A1 | | | 4/1993 |

* cited by examiner

*Primary Examiner*—William E. Tapolcai
*Assistant Examiner*—Mohammad M. Ali
(74) *Attorney, Agent, or Firm*—Foley & Lardner LLP

(57) ABSTRACT

An air conditioning apparatus includes a refrigerating cycle supplying the supercritical refrigerant pressurized by the variable displacement compressor to the outdoor heat exchanger, the expansion valve and the indoor heat exchanger, in sequence and subsequently return the supercritical refrigerant to the variable displacement compressor. The apparatus further includes a displacement control unit that establishes a limit value derived from the engine speed and further controls a discharge volume of the compressor prior to the control in the opening degree of the expansion valve, on a basis of the so-established limit value.

5 Claims, 8 Drawing Sheets

AIR CONDITIONING APPARATUS USING SUPERCRITICAL REFRIGERANT FOR VEHICLE

BACKGROUND OF THE INVENTION

The present invention relates to an air conditioning apparatus for a vehicle. More particularly, the present invention relates to an air conditioning apparatus using supercritical refrigerant, which is characterized by a refrigerating cycle to perform air conditioning while using the supercritical refrigerant.

Recently, the air conditioning apparatus for a vehicle is apt to employ, as a refrigerant in a refrigerating cycle, carbon dioxide gas as being a supercritical fluid maintained to be more than gas-liquid critical temperature and pressure. In such an air conditioning apparatus, even if the refrigerant leaks out, it is possible to reduce its influence on the environment due to the use of carbon dioxide gas as the refrigerant.

Generally, the refrigerating cycle includes a compressor, a condenser (or gas cooler), an expansion valve (throttle valve), an evaporator and an accumulator (low-pressure receiver). However, there is also provided a different refrigerating cycle to interpose an inside heat exchanger between the accumulator and the compressor. These air conditioning apparatuses are adapted so as to attain a cooling capacity with an optimum evaporating pressure on control of a quantity of circulating refrigerant and a pressure on the high-pressure side of the compressor by adjusting the opening degree of the expansion valve (see Japanese Patent No. 2931668).

In these air conditioning apparatuses each employing the supercritical refrigerants, there is an air conditioning apparatus that includes a compressor in the refrigerating cycle of carbon dioxide gas, the compressor being a variable displacement type compressor driven by an engine of a vehicle, and a control valve allowing a differential pressure between high pressure and low pressure in the refrigerating cycle to be adjusted constantly, the control valve being controlled by temperatures about an evaporator (e.g. temp. of refrigerant or blow-off temp). In such an apparatus, when the engine speed (number of revolutions) increases due to a vehicle's accelerating, the number of revolutions of the compressor is also increased simultaneously, so that a discharge amount of the refrigerant to be discharged from the compressor does increase. That is, an amount (referred "circulating refrigerant amount") of refrigerant circulating in the refrigerating cycle is also increased.

Here noted, it is desirable that the apparatus is controlled so as to reduce the discharge volume of the compressor in order to make the above circulating refrigerant amount constant.

However, this restriction for discharge volume about the compressor causes a lower-side pressure in the refrigerating cycle and a refrigerant temperature to be reduced together. In such a case, the responsibility of the apparatus grows late due to the great influence of heat capacity of the refrigerant. While, since the apparatus is swift to respond against pressure fluctuation in the refrigerant, the control of the control valve takes a lead against a rising of a higher-side pressure in the refrigerating cycle.

Thus, since the control width of compressor displacement in reducing the flow rate of refrigerant is narrowed, there is a possibility that the circulation flow rate of refrigerant is increased out of control thereby increasing the cooling capacity of the air conditioning apparatus. Consequently, the engine output is excessively consumed in order to drive the compressor. Additionally, since both cooling capacity and compressor torque are excessively consumed during a period from the start of controlling the variable displacement in the compressor till the completion, there are induced various problems, for example, reduction in fuel consumption, reduction in accelerating capability, hunting in blow-off temperature, etc.

SUMMARY OF THE INVENTION

In such a situation, it is an object of the present invention to provide an air conditioning apparatus using supercritical refrigerant for a vehicle, which includes a variable displacement type compressor driven by an engine in addition to the control of a control valve and which could reduce a circulating amount of the refrigerant even when the number of revolutions of the engine (engine speed) is elevated, thereby ensuring the accelerating capability of the vehicle.

According to the present invention, the above-mentioned object is accomplished by an air conditioning apparatus using supercritical refrigerant for a vehicle, comprising: a refrigerating cycle to supply the supercritical refrigerant pressurized by the variable displacement compressor to the outdoor heat exchanger, the expansion valve and the indoor heat exchanger, in sequence and subsequently return the supercritical refrigerant to the variable displacement compressor; and displacement control means that establishes a limit value derived from the number of revolutions of the engine and further controls a discharge volume of the variable displacement compressor prior to a control of an opening degree of the expansion valve, on a basis of the limit value.

With the above-mentioned constitution of the air conditioning apparatus, by making a differential pressure between high pressure and low pressure in the variable displacement compressor and its discharge flow rate both constant when the engine speed is increased, it becomes possible to maintain an essential cooling capacity, providing that an amount of the supercritical refrigerant circulating in the refrigerating cycle is generally constant while fixing the opening degree of the expansion valve. Furthermore, with the prevention of both excessive cooling capacity and compressor torque from being increased, it is possible to attain the saving of fuel consumption.

These and other objects and features of the present invention will become more fully apparent from the following description and appended claims taken in conjunction with the accompany drawings.

DETAILED DESCRIPTION OF THE PREFERRED EMBODIMENT

Figure 1:
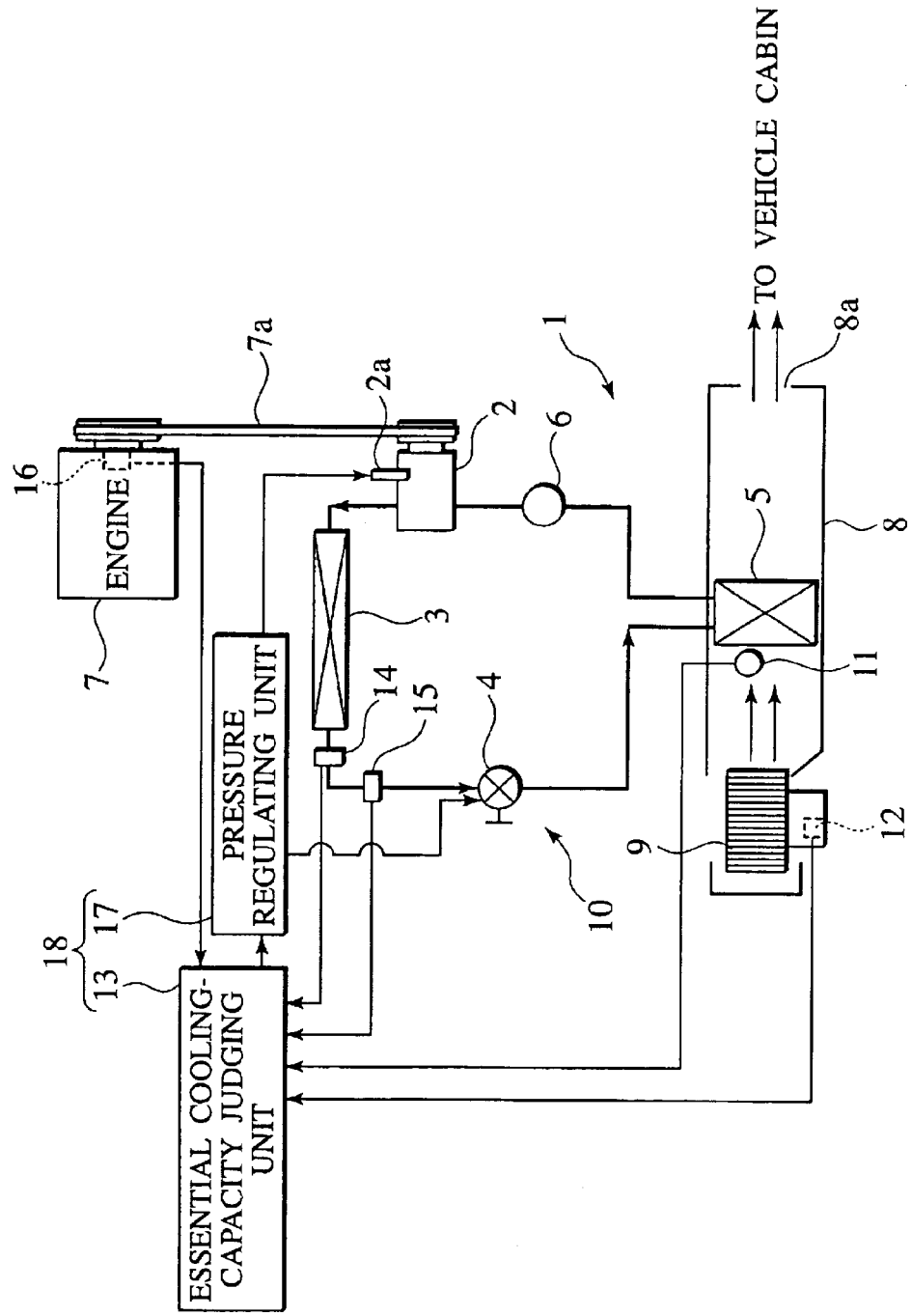
FIG. 1 is a schematic structural view of an air conditioning apparatus embodying a refrigerating cycle using a supercritical refrigerant, in accordance with one embodiment of the present invention.

An embodiment of the present invention will be described with reference to accompanying drawings. FIG. 1 is a schematic structural view of an air conditioning apparatus embodying a refrigerating cycle using a supercritical refrigerant, in accordance with one embodiment of the present invention. In FIG. 1, reference numeral 1 designates an air conditioning apparatus for a vehicle, which forms a refrigerating cycle 10 using supercritical refrigerant of the present invention.

According to the refrigerating cycle 10 of this embodiment, the supercritical refrigerant is pressurized by a variable displacement type compressor 2 (which will be simply referred "compressor" after). In the cycle 10, the pressurized refrigerant is fed to a condenser 3 as an outdoor heat exchanger, an expansion valve 4 and an evaporator 5 as an indoor heat exchanger, in order. Subsequently, the supercritical refrigerant is returned to the compressor 2 by way of an accumulator 6. The refrigerating cycle 10 is formed by the above-mentioned flow of the supercritical refrigerant.

The compressor 2 is driven by an engine 7 through the intermediary of a belt 7a. Additionally, the compressor 2 is provided with a pressure regulating valve 2a for controlling a discharge rate of the refrigerant to be discharged from the compressor 2.

The evaporator 5 is accommodated in an air-conditioning duct 8. Also accommodated in the air-conditioning duct 8 is an air-conditioning fan 9 that generates air-conditioning wind. Since the air-conditioning wind produced is by the air-conditioning fan 9 passes through the evaporator 5, the same wind is subjected to heat exchange and changed to cooling wind accordingly. The resulting cooling wind is blown into a vehicle cabin through a blow-off port 8a.

Regarding the flow of the air-conditioning wind produced by the air-conditioning fan 9, a temperature sensor 11 is arranged on the upstream side of the evaporator 5 to detect a temperature of the air-conditioning wind supplied into the evaporator 5. While, there is arranged a voltage sensor 12 that detects a drive voltage for the air-conditioning fan 9 thereby detecting its capability of airflow. Respective detection signals from the temperature sensor 11 and the voltage sensor 12 are respectively inputted to an essential cooling capacity judging unit 13.

Regarding the flow of the supercritical refrigerant forming the refrigerating cycle 10, a refrigerant temperature sensor 14 and a refrigerant pressure sensor 15 are arranged in a refrigerant passage (part) on the downstream side of the condenser 3. Both refrigerant temperature and refrigerant pressure detected by the refrigerant temperature sensor 14 and the refrigerant pressure sensor 15 are inputted to the essential cooling capacity judging unit 13. The engine 7 is provided with an engine-speed (revolutions) detecting sensor 16 for detecting the number of engine revolutions. The so-detected number of engine revolutions is also inputted to the essential cooling capacity judging unit 13 to establish a limit value.

Based on the detection values of the sensors 11, 12, the essential cooling capacity judging unit 13 calculates an appropriate cooling capacity generated in the refrigerating cycle 10 and further outputs the resulting calculation result to a pressure regulating unit 17. On receipt of the calculation result, this pressure regulating unit 17 calculates an appropriate discharge rate (volume) of the compressor 2 and an appropriate opening degree of the expansion valve 4 and further outputs respective control signals to the compressor 2 and the expansion valve 4 thereby to control both of the discharging displacement (discharge volume) of the compressor 2 and the appropriate opening degree of the expansion valve 4.

The essential cooling capacity judging unit 13 and the pressure regulating unit 17 do constitute displacement control means 18 that controls the discharge volume of the compressor 2 prior to the opening control of the expansion valve 4, based on the above limit value. This limit value is determined by the following conditions of:

① condition of a maximum value requiring to add air-conditioning in vehicle;

② condition to maximize an excluded volume of refrigerant in the compressor 2; and ③ condition to maximize a coefficient of performance (COP) by the opening degree of the expansion valve 4.

By establishing the number of revolutions of the compressor 2 satisfying the above conditions ①, ② and ③ as a control point, the number of revolutions of the engine 7 at that time is defined as the limit value. When an actual number of revolutions of the engine 7 gets more than the above limit value, the discharge volume of the compressor 2 is controlled so as to make a constant "high-low" differential pressure of the compressor 2 at the limit value.

Figure 2:
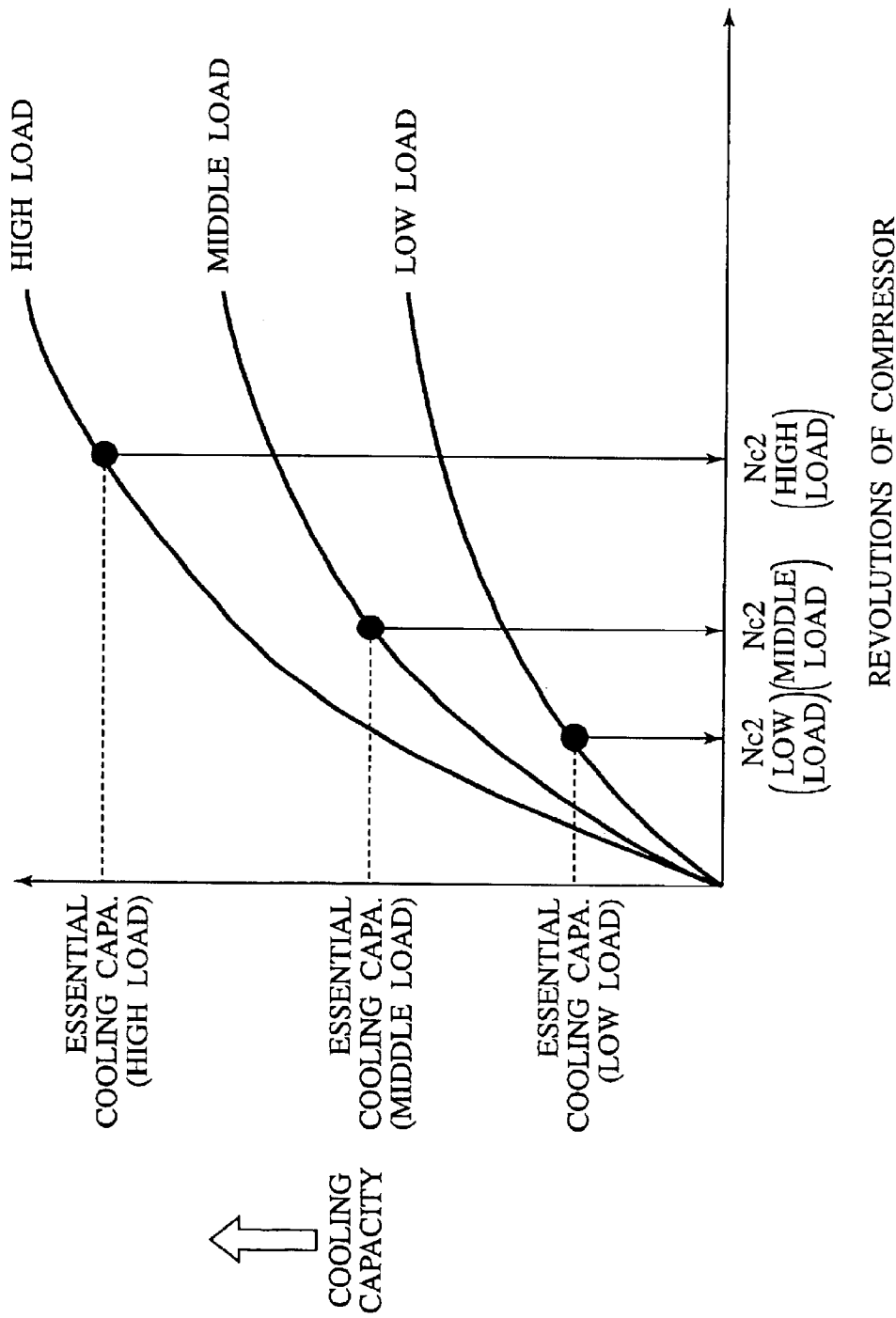
FIG. 2 is an imaginary graph showing the maximum revolutions of a compressor in a full-stroke condition against essential cooling capacities of the embodiment of the present invention.

FIG. 2 is an imaginary graph showing the maximum revolutions of the compressor 2 in its full-stroke condition against various essential cooling capacities.

The above appropriate cooling capacity that the essential cooling capacity judging unit 13 does calculate is a cooling capacity that does not cause the evaporator 5 to be frozen. Also, the appropriate cooling capacity is a cooling capacity Q to attain a blow-off temperature preset by a passenger, as shown in FIG. 2. Then, a refrigerating capacity at every number of revolutions of the compressor 2 is previously memorized in the essential cooling capacity judging unit 13.

Then, it is noted in FIG. 2 that the number "Nc2" is the maximum revolutions of the compressor 2 (in full-stroke) that is obtained by the essential cooling capacity Q and that allows a coefficient of performance COP due to the opening degree of the expansion valve 4 to be maximized and controlled in pressure.

Figure 3:
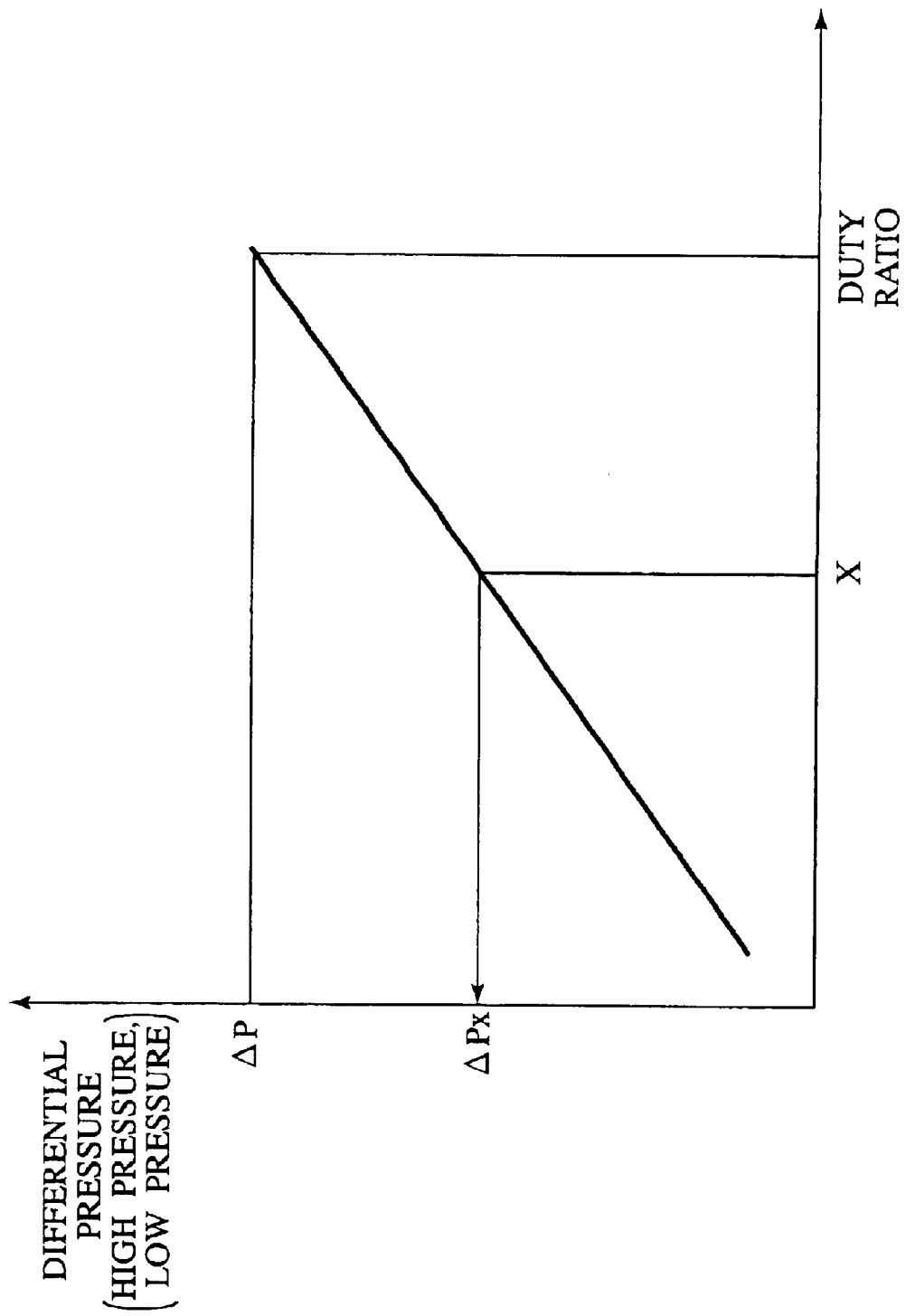
FIG. 3 is a characteristic diagram of valve openings of a pressure regulating valve of the compressor, in accordance with the embodiment of the present invention.

FIG. 3 is a characteristic diagram of valve opening of the pressure regulating valve 2a of the compressor 2.

The refrigerating capacity stored in thee essential cooling capacity judging unit 13 contains a lifting characteristic (determined by differential pressure and flow characteristic) of the compressor 2 and an appropriate high pressure in relation to the temperature of the refrigerant at an exit of the condenser 3, that is, an appropriate opening degree of the expansion valve 4, as shown in FIG. 3.

In FIG. 3, the shown lifting characteristic is represented by a differential pressure between high pressure and low pressure of the compressor 2 and a duty ratio determining the discharge volume of the compressor 2. In the essential cooling capacity judging unit 13, there are stored an appropriate opening degree of the expansion valve 4 at every loads of ambient air (set value of high pressure), and a discharge volume of the compressor 2 required to attain the set value of high pressure.

That is, according to this embodiment, the essential cooling capacity Q at every load and the number of revolutions Nc2 of the compressor 2 in the full stroke condition, the number being required to attain the cooling capacity Q, are respectively determined, as shown in FIG. 2. It is performed to judge whether the essential cooling capacity Q is satisfied at the revolution number Nc2 of the compressor 2 in its full stroke condition or not. If exceeding the revolution number Nc2, the control of the compressor 2 is changed to a variable displacement control, that is, control for suppressing the discharge volume of the compressor 2 thereby maintaining the essential cooling capacity Q.

Figure 5:
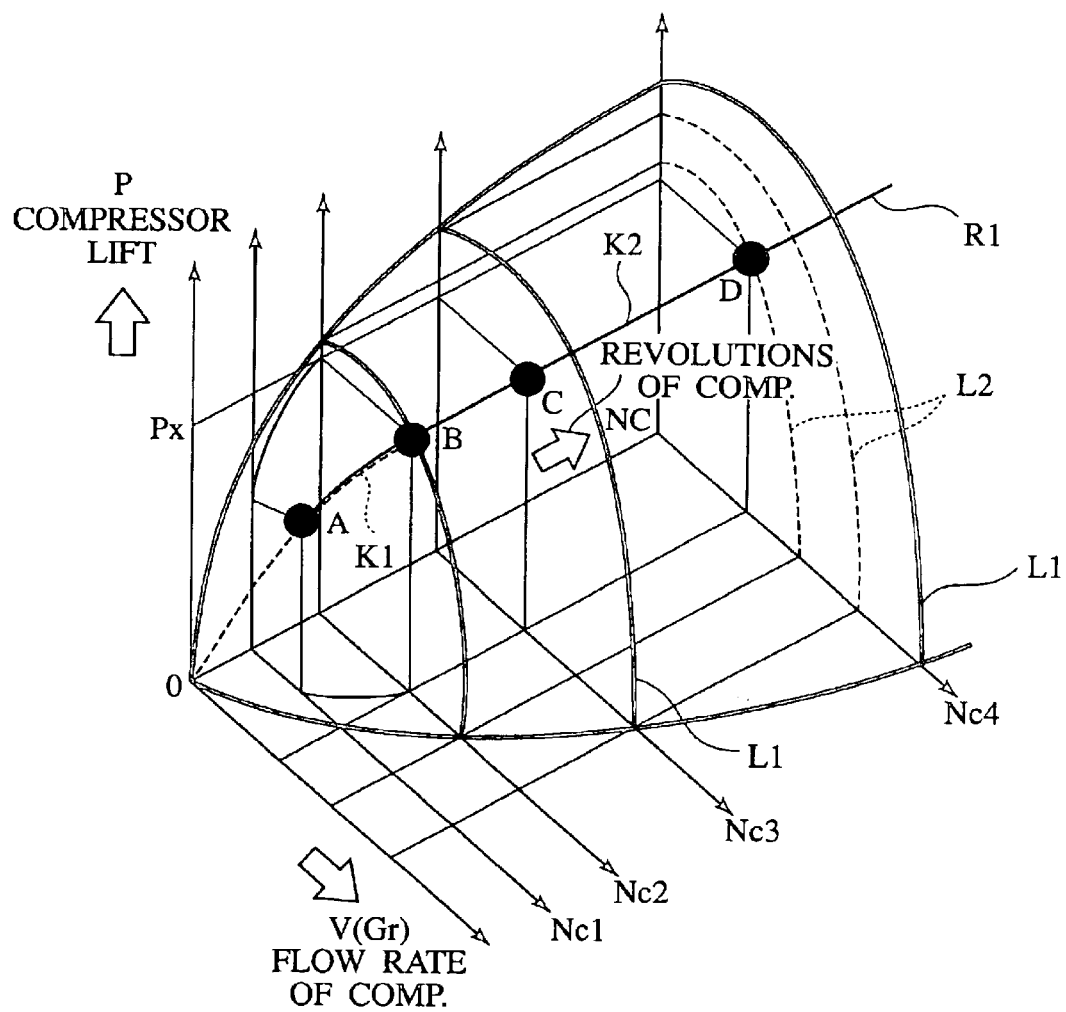
FIG. 5 is a three-dimensional control diagram showing a relationship among compressor lift, flow rate of compressor and revolutions of compressor, in accordance with the embodiment of the present invention.

FIG. 5 is a three-dimensional control diagram showing a relationship among the lift (lifting height) of the compressor 2, the flow rate of the compressor 2 and the revolutions of the compressor 2.

If the compressor 2 rotates at a revolution number Nc1 that cannot accomplish a target cooling capacity Q (e.g. vehicle's idle state, vehicle's traveling at a low speed, etc.) as shown in FIG. 5, the compressor 2 is driven at its full stroke, while the expansion valve 4 is controlled so as to attain an optimal high pressure from the outlet temperature of the condenser 3.

Noted, in FIG. 5, each solid line L1 denotes a maximum lifting capability of the compressor 2 corresponding to each revolution number Nc thereof. While, each broken line L2 denotes a lifting capability under condition that the discharge volume of the compressor 2 is being controlled. Regarding a PVN-line R1 shown in FIG. 5, in a range K1 between one point A and another point B, it is carried out to give preference to the optimal control in the coefficient of performance COP of the expansion valve 4. In a range K2 between a point B and a point D, both of a flow rate V (Gr) and a differential pressure ΔP become generally constant.

Figure 4:
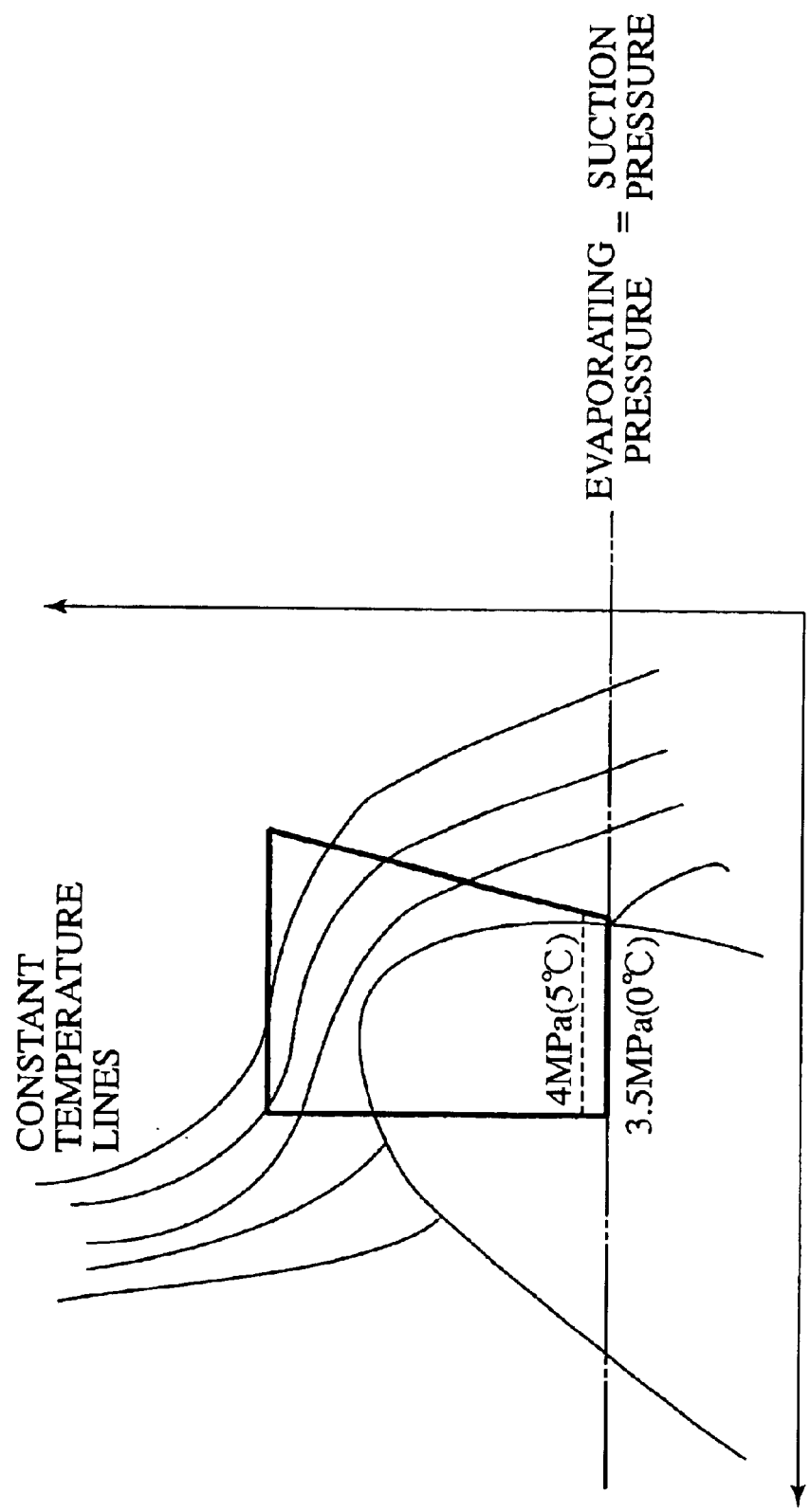
FIG. 4 is a Mollier diagram showing a evaporating pressure of carbon dioxide, in accordance with the first embodiment of the present invention.

Here, the pressure regulating valve 2a of the compressor 2 controls so as to maintain a constant differential pressure ΔP between high pressure and low pressure corresponding to an impressed duty ratio as shown in FIG. 3 (Low differential pressure maintenance characteristic). When expressing the control image at this time in the form of a Mollier diagram of FIG. 4, in case of the refrigerant of carbon dioxide gas as the supercritical fluid, the evaporation temperature at the evaporator 5 becomes 0° C. to 5° C., while the evaporation pressure (Pe) undergoes a transition in a range from 3.5 MPa to 4 MPa.

Referring to the characteristic of the pressure regulating valve 2a of FIG. 3, due to the pressure regulating valve 2a, the evaporation pressure transits at generally constant values on the lower pressure side. While, the evaporation pressure on the high pressure side can be controlled by altering the duty ratio of the pressure regulating valve 2a.

Accordingly, if the rotating speed (revolution number) of the engine 5 is increased so that the number of revolutions of the compressor 2 rises, then the essential cooling capacity judging unit 13 calculates the revolution number Nc2 reaching the essential cooling capacity Q in real time. On determination of the revolution number Nc2, when the number of revolutions of the compressor 2 reaches the so-determined number Nc2, the displacement control means 18 reads in a "high-pressure side" pressure at that time.

Further, the displacement control means 18 calculates a differential pressure between the above "high-pressure side" pressure and the evaporation pressure Pe at the evaporator 5 and further determines a duty ratio enabling maintenance of the present pressure condition from the characteristic values (see FIG. 3) of the pressure regulating valve 2a stored in the essential cooling capacity judging unit 13. The so-determined duty ratio is generated to the pressure regulating valve 2a.

At this time, the opening degree of the expansion valve 4 is fixed so as to maintain the present opening degree. This fixation about the expansion valve 4 is maintained even if the revolution number of the compressor 2 exceeds the value Nc2. While, if the revolution number of the compressor 2 becomes less than the value Nc2, the above fixation is cancelled.

That is, as shown in FIG. 5, when the revolution number of the compressor 2 is low (e.g. Nc1) so as not to reach the target cooling capacity Q (between the points A and B), there is carried out a throttle control to maximize the opening degree of the expansion valve 4 in its efficiency. To the contrary, when the revolution number of the compressor 2 reaches the value Nc2, the pressurizing condition of the compressor 2 at that time is maintained due to the duty-ratio control in the pressure regulating valve 2a.

Figure 6:
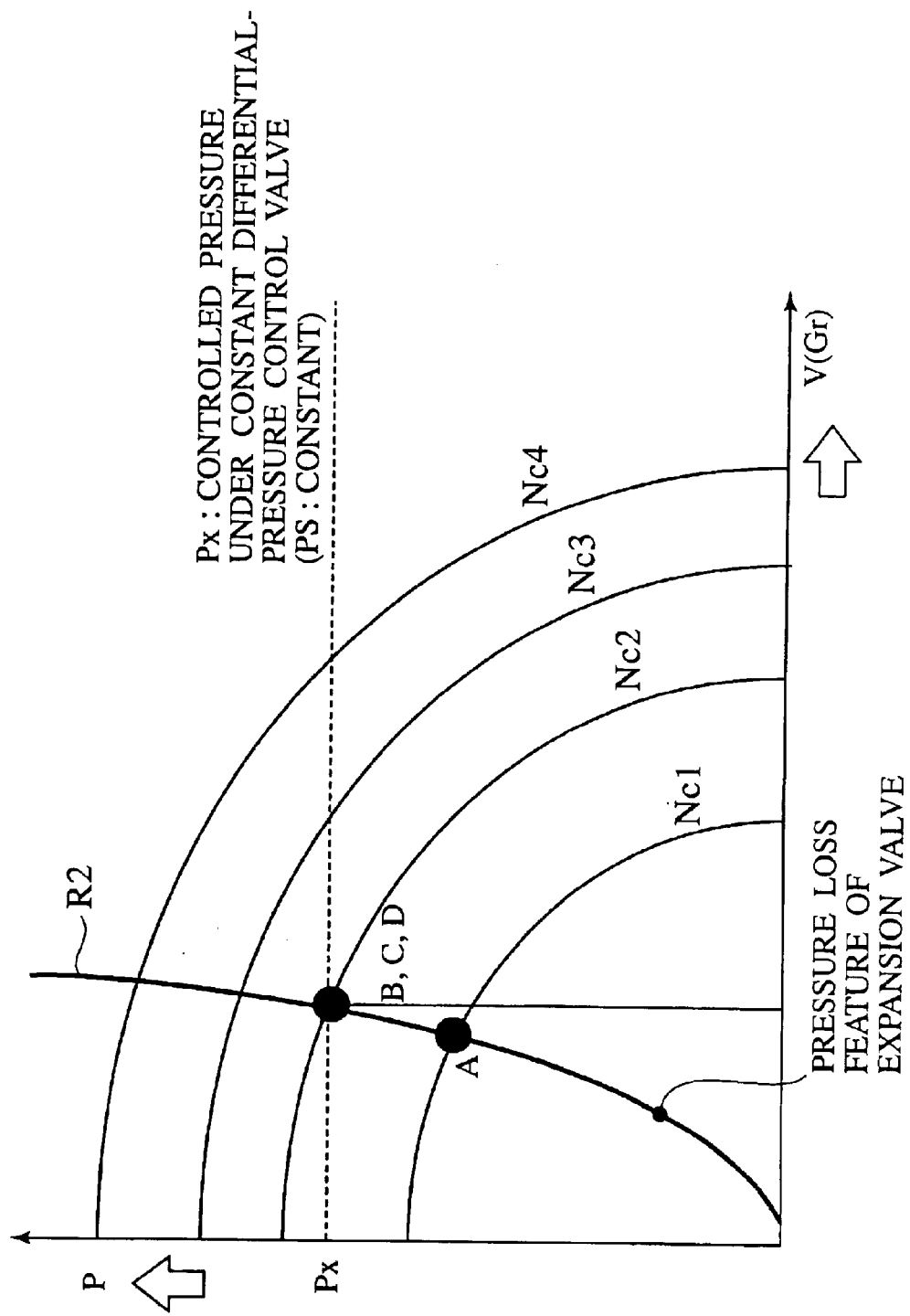
FIG. 6 is a two-dimensional control diagram showing a relationship between compressor lift and flow rate of compressor, in accordance with the embodiment of the present invention.

FIG. 6 is a two-dimensional control diagram showing a relationship between the lift of the compressor 2 and the flow rate of compressor 2.

This pressure maintaining condition is not changeable even when the revolution number of the compressor 2 is elevated. Thus, as shown in FIGS. 5 and 6, in a range from the revolution number Nc2 till the maximum revolution number Nc4 (i.e. range between the points B and D), not only the differential pressure but the discharge flow rate of the compressor 2 are maintained to be constant respectively. Noted, in FIG. 6, a PV line R2 designates maximum capabilities of the compressor at respective revolution numbers Nc.

In this way, since the differential pressure between high pressure and low pressure of the compressor 2 and the discharge flow rate are respectively constant and furthermore, the opening degree (throttle value) of the expansion valve 4 is also fixed, the amount of refrigerant circulating the refrigerating cycle 10 remains unchanged within the range from the revolution number Nc2 to the revolution number Nc4, so that an essential cooling capacity Q can be maintained.

Figure 7:
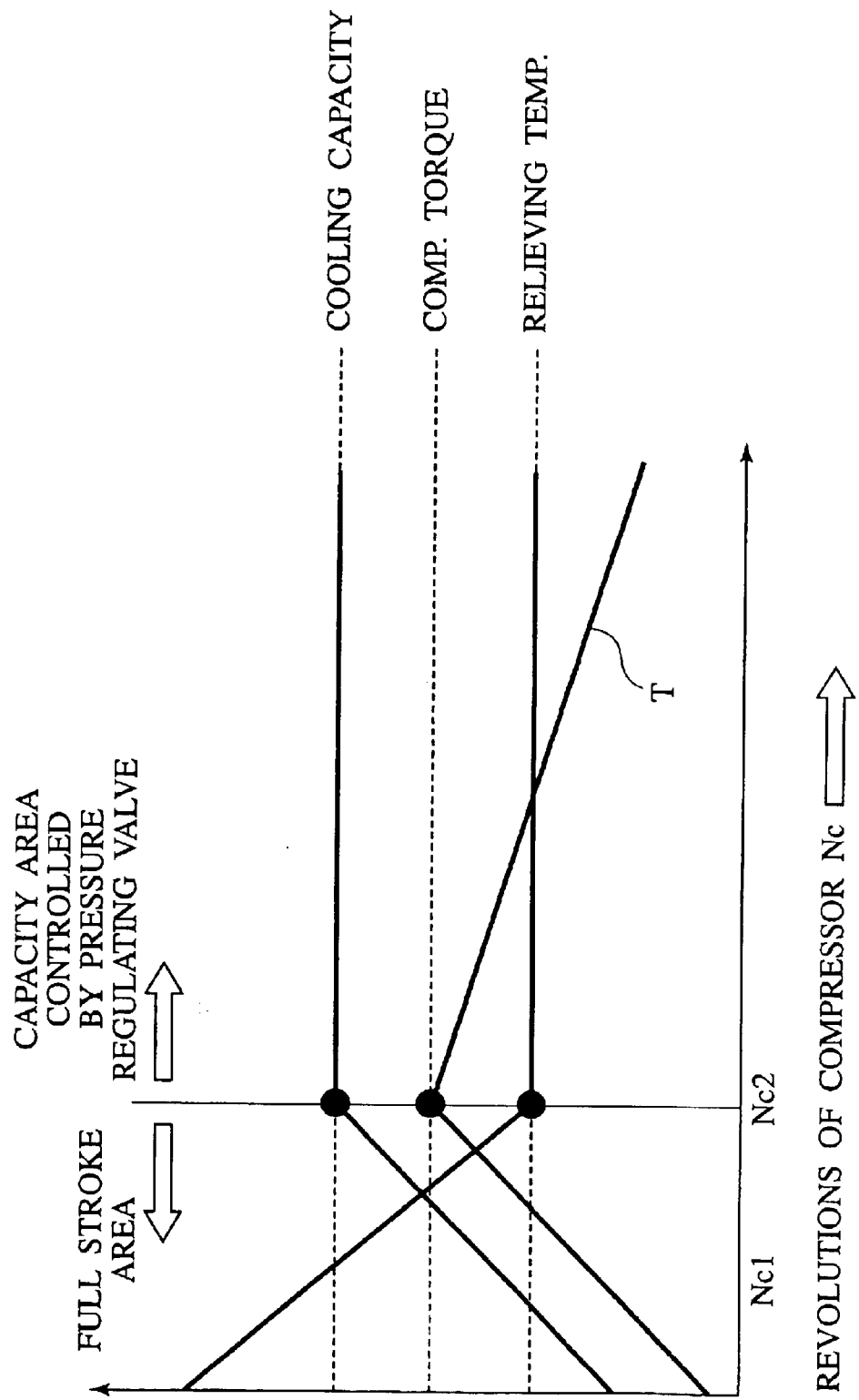
FIG. 7 is a diagram explaining an energy consumption image in the embodiment of the present invention.

FIG. 7 is a diagram explaining an energy consumption image of this embodiment.

As mentioned above, according to this embodiment, the air-conditioning apparatus 1 does form the refrigerating cycle 10 employing carbon dioxide gas as the supercritical refrigerant and is constructed so that the variable displacement type compressor 2 circulates such a refrigerant, as shown in FIG. 1. Additionally, as shown in FIG. 7, when the revolution number of the compressor 2 gets more than the revolution number Nc2 as a threshold value, the displacement control means 18 makes the differential pressure and the discharge flow rate of the compressor 2 constant and further fixes the opening degree of the expansion valve 4. Accordingly, it becomes possible to maintain the essential cooling capacity Q without changing the amount of refrigerant circulating the refrigerating cycle 10 within the range from the revolution number Nc2 to the revolution number Nc4.

Figure 8:
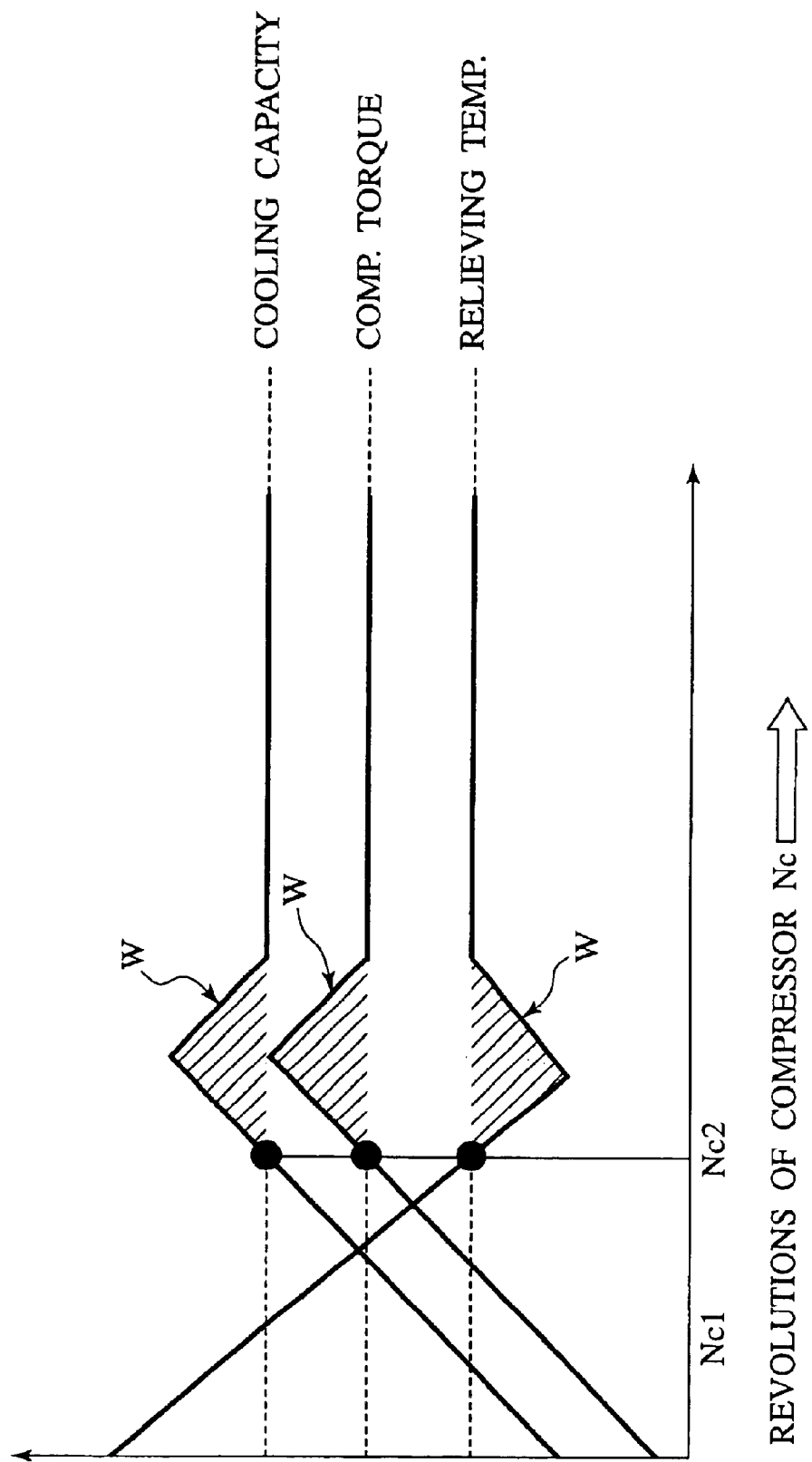
FIG. 8 is a diagram explaining the conventional energy consumption image.

FIG. 8 is a diagram explaining the conventional energy consumption image.

In the conventional art, wasteful energy is consumed as shown with shaded areas W of FIG. 8. To the contrary, according to this embodiment, it is possible to prevent an excessive cooling capacity Q and a compressor torque from being increased thereby accomplishing fuel consumption saving, as shown in FIG. 7. Additionally, due to the constant cooling capacity Q, it is possible to prevent an occurrence of hunting in blow-off temperature, whereby comfortable air-conditioning wind can be provided.

Noted, in an area of FIG. 7 where the revolution number is more than a value Nc2, the compressor torque represents a constant compressor motivity (=torque×revolution number). Thus, in the same area, if the revolution number is increased, then a torque T is lowered accordingly.

Further, according to the embodiment, when changing the discharge volume of the compressor 2 by the pressure regulating valve 2a, the opening degree of the expansion valve 4 is controlled at an optimum efficiency. Thus, even if the revolution number of the compressor 2 is within the range from Nc2 to Nc4 where the discharge volume is variable, it is possible to drive the compressor 2 at an optimum efficiency, namely, driving of the compressor 2 of high coefficient of performance COP.

Additionally, by making the cooling capacity Q constant, the resulting fixed motivity allows a burden on the engine 7 to be reduced, whereby the drivability of the vehicle, such as acceleration, can be improved.

Especially, as the refrigerating cycle 10 of this embodiment employs, as the refrigerant, carbon dioxide gas that is supercritical at a high pressure, the refrigerant does not condense in a high-pressure area. While, in the conventional refrigerating cycle that employs fluorocarbon refrigerant, if the revolution number of the compressor 2 rises, then a pressure on the high pressure side is elevated remarkably. According to this embodiment, however, since it is possible to make a pressure on the high pressure side constant when the revolution number of the compressor 2 is more than Nc2, there is no need to provide any means for such a rise in pressure, whereby the structure of the air conditioning apparatus can be simplified.

Furthermore, since the embodiment is characterized by controlling a pressure whose propagation velocity is equal to sonic speed, it is possible to perform such a control rapidly.

According to the embodiment, by controlling the duty ratio of the pressure regulating valve 2a just before the revolution number of the compressor 2 reaches Nc2 in accordance with a command signal from the engine's side, the torque of the compressor 2 is reduced instantaneously, allowing the acceleration performance to be improved. In connection, due to the adjustment in the duty ratio of the pressure regulating valve 2a, it is also possible to optionally adjust such a reduction width in torque of the compressor 2.

In detail, for example, if instantaneously reducing the torque of the compressor at a vehicle's accelerating from its traveling at low speed, then it becomes possible to improve the accelerating performance of the vehicle exponentially. While, when the revolution number of an engine drops, if it is carried out to instantaneously reduce the torque of the compressor and subsequently bring it back gradually, then it is possible to prevent an occurrence of engine stall at the engine's rotating at low speed near the idle state.

By use of carbon dioxide gas as the supercritical refrigerant for the refrigerating cycle 10, there exists a correlation between the lifting work of the compressor 2 and the resulting torque. Further since the pressure regulating valve controls the lifting work (i.e. differential pressure between high pressure and low pressure) of the compressor 2, it is possible to aim the target torque. Therefore, it is possible to perform a cooperative control between one engine requiring such a delicate control (e.g. lean burn engine, direct injection engine, etc.) and another engine having a small engine torque (e.g. engine for light car).

Finally, it will be understood by those skilled in the art that the foregoing descriptions are nothing but one embodiment of the disclosed air conditioning apparatus using supercritical refrigerant for a vehicle. Besides this embodiment, various changes and modifications may be made to the present invention without departing from the scope of the invention.

What is claimed is:

1. An air conditioning apparatus using supercritical refrigerant for a vehicle, comprising:

a refrigerating cycle to supply the supercritical refrigerant pressurized by a variable displacement compressor to an outdoor heat exchanger, an expansion valve and an indoor heat exchanger, in sequence and subsequently return the supercritical refrigerant to the variable displacement compressor; and displacement control means that establishes a limit value derived from a number of revolutions of an engine and further controls a discharge volume of the variable displacement compressor prior to a control of an opening degree of the expansion valve, on a basis of the limit value.

2. The air conditioning apparatus using supercritical refrigerant for the vehicle of claim 1, wherein the limit value derived from the number of revolutions of the engine is determined by a first condition of a maximum value requiring to add air-conditioning in vehicle; a second condition to maximize an excluded volume of refrigerant in the compressor; and a third condition to maximize a coefficient of performance by the opening degree of the expansion valve.

3. The air conditioning apparatus using supercritical refrigerant for the vehicle of claim 2, wherein, on establishment of the number of revolutions of the compressor satisfying the first, second and third conditions as a control point, the limit value is formed by the number of revolutions of the engine at a time when the number of revolutions of the compressor reaches the control point.

4. The air conditioning apparatus using supercritical refrigerant for the vehicle of claim 1, wherein the displacement control means controls a displacement of the compressor so that a differential pressure of the compressor at the limit value becomes constant when an actual number of revolutions of the engine becomes more than the limit value.

5. The air conditioning apparatus using supercritical refrigerant for the vehicle of claim 1, wherein the displacement control means comprises:

an essential cooling capacity judging unit that inputs both temperature and pressure of the supercritical refrigerant and the number of revolutions of the engine thereby to establish the limit value and that calculates an appropriate cooling capacity that the refrigerating cycle can produce; and a pressure regulating unit that inputs the appropriate cooling capacity calculated by the essential cooling capacity judging unit and outputs controls signals to the compressor and the expansion valve so as to attain the appropriate cooling capacity in the air conditioning apparatus.

* * * * *